United States Patent Office 3,250,730
Patented May 10, 1966

3,250,730
PREPARATION OF MOLDED PLASTIC ARTICLES
David A. Palmer, Wilmington, Del., assignor to Hercules Powder Company, Wilmington, Del., a corporation of Delaware
No Drawing. Filed Oct. 15, 1962, Ser. No. 230,678
The portion of the term of the patent subsequent to June 16, 1981, has been disclaimed
3 Claims. (Cl. 260—2.5)

This invention relates to a process of preparing molded plastic articles and, more particularly, to a method of producing molded articles made of cellular polypropylene.

The fabrication of three-dimensional foamed thermoplastic compositions is well known wherein the thermoplastic composition containing a material which generates gas on decomposition, i.e. a blowing agent, is heated in an extruder or injection molding machine to a temperature which releases such gases and extruding or injecting the molten mass into a mold whereupon foaming and shaping occur essentially simultaneously. Such processes may be employed with noncrystalline thermoplastic polymers, such as polystyrene, but have been unsuccessful with polypropylene because, at the temperatures necessary to convert the expandable composition into a fluid mass, its melt viscosity is too low to withstand expansion by the gases generated from the blowing agents without rupture of the cell walls so that the foam fails to expand to fill the mold and produce the shaped article.

Now in accordance with this invention it has been found that molded shaped articles can be produced by externally applying a mechanical force to the male portion of a matched mold pair, onto a polypropylene composition contained in the female portion of the mold, wherein the polypropylene composition comprises a mixture of stereoregular polypropylene, a blowing agent, and an azido cross-linking agent, and said composition is heated to a temperature above the softening point of the composition and sufficient to release the gas from the blowing agent and to effect cross-linking of the polypropylene. It was entirely unexpected to find that an expandable polypropylene composition could be so fabricated. When a cross-linking agent is not employed, as described in this invention, the molten mass is largely open celled due to rupture of the cell walls by the expanding gases; and, furthermore, the foam collapses to a fraction of its original volume during cooling. Thus, when such a foamed mass is shaped by application of pressure by the plunger, the resulting structure is considerably higher in density than the original foam, is non-uniform in cellular structure and is predominantly open celled.

One method of carrying out the process of this invention is to extrude, or introduce by any other means, the mixture of stereoregular polypropylene, blowing agent and azido cross-linking agent, in a molten condition into an open cavity of a mold whereupon foaming of the mass occurs. It is then shaped into a three-dimensional structure by the application of pressure from a plunger of suitable shape being forced into this cavity. By such application of pressure of the plunger, the foamed plastic mass retains its closed cell structure, but is caused to flow into the shape of the free space between the plunger and the mold. The density of the resulting shaped article is essentially the same as that of the original foamed mass before shaping.

An alternate method of carrying out this invention is to place a quantity of unexpanded, or partially expanded, pellets made of the mixture of stereoregular polypropylene, blowing agent, and cross-linking agent into the aforementioned mold cavity and heating said mold and pellets to a temperature above the softening temperature of the pellets and sufficient to effect further release and expansion of the blowing gases and to effect cross-linking of the polypropylene. While the pellets are in this softened state, the plunger is forced into the cavity as described above which causes the molten plastic to flow into the shape of a three-dimensional article as determined by the relative shapes of the male and female portions of the matched mold set.

In carrying out the process of this invention, the temperature used for the molding operation must be sufficient to convert the plastic foam into a condition such that it is fluid under the pressure applied by the plunger. The expansion of the gases within the foamed composition should be essentially complete before the application of such pressure. Some cross-linking of the polymer must also have occurred at this time in order to prevent cell rupture, but need not have been completed as completion of the cross-linking reaction can be effected by subjecting the shaped article to additional heating. The exact temperature to be employed will depend on several factors, but always will be at least above the softening temperature of the mixture of the polypropylene, cross-linking agent and blowing agent up to a temperature of about 275° C. The softening temperature of the mixture will depend upon whether the blowing agent is a solvent type or a chemical type. Thus, with a solvent type, the polypropylene will at least partially dissolve so that the softening temperature of the blend can be as low as 135° C.; and, hence, the foam can be shaped by means of the plunger at temperatures as low as 135° C. and subsequently heated to temperatures above about 180° C. to complete the cross-linking reaction. On the other hand, if chemical blowing agents are employed, which do not reduce the softening temperature of polypropylene, the whole operation will be carried out at a temperature above about 165° C., the melting point of the polymer. Accordingly, for solvent blowing blends the process will be operated at temperatures from the softening temperature of the blend up to about 275° C., and for chemical blowing blends the process will be operated at a temperature of from about 165° C. to about 275° C. and preferably from about 190° C. to about 250° C.

Any stereoregular polypopylene may be used to prepare the molded articles in accordance with this invention, but generally polypropylenes having a reduced specific viscosity (RSV) of from about 1 to about 5 and, more preferably, from about 2 to about 3, are used, said reduced specific viscosity being determined on a 0.1% solution of the polymer in decahydronaphthalene at a temperature of 135° C.

Any of the well-known chemical blowing agents may be used in the preparation of the foams in accordance with this invention as, for example, azo bis(formamide), diazoaminobenzene, N,N'-dinitrosopentamethylene tetramine, N,N' - dimethyl - N,N'-dinitrosoterephthalamide, p,p'-oxy-bis(benzene sulfonyl semicarbazide), azo bis (isobutyronitrile), p,p' - oxy - bis(benzene sulfonyl hydrazide), p,p'-diphenyl-bis(sulfonyl hydrazide), benzene-sulfonyl hydrazide, m-benzene-bis(sulfonyl hydrazide), etc. Any of the well-known solvent blowing agents may also be used in this invention as, for example, monochlorotrifluoromethane, monochlorodifluoromethane, dichlorotetrafluoroethylene, trichloroethylene, chloroform, carbon tetrachloride, and low boiling hydrocarbons such as butane, pentane, hexane, etc. Accordingly, any compound which decomposes or volatilizes to yield at least one mole of gas per mole of blowing agent at a temperature of 190° C. or less may be used.

Any azido cross-linking agent may be used in the preparation of the polypropylene foams used in this invention. Thus, any poly(sulfonazide), i.e., any compound having the general formula $$R[SO_2N_3]_x$$

where R is an organic radical inert to the cross-linking reaction and $x$ is an integer greater than 1, can be used in the process of this invention. Preferably, $x$ will be an integer from 2 to 100 and R will be selected from the group of organic radicals consisting of alkylene, arylene, aralkylene, and alkarylene radicals; however, these radicals can also contain ether, alcohol, halogen, etc., groups which are inert to the cross-linking reaction. Exemplary of the poly(sulfonazide)s that may be used are 1,7-heptane-bis(sulfonazide), 1,10 - decane-bis(sulfonazide), 1,11-undecane-bis(sulfonazide), 1,12-dodecane - bis(sulfonazide), 7-oxa-tridecane-1,13-bis(sulfonazide), 6-thia-undecane-1,11-bis(sulfonazide); chloroaliphatic poly(sulfonazide)s such as the poly(sulfonazide) produced from a chloro- and sulfochlorinated mixture of petroleum hydrocarbons containing at least one chlorine atom and at least two sulfonazide groups per molecule; 1,9,18-octadecane-tris(sulfonazide), poly(ethylene sulfonazide), poly (sulfonazido-methyl styrene), 1,3- and 1,4-bis(sulfonazido-methyl benzene), 1,3-benzene bis(sulfonazide), 1-octyl-2,4,6 - benzene tris(sulfonazide), 4,4' - diphenylmethane bis(sulfonazide), 4,4'-diphenyl ether bis(sulfonazide), 4,4' - bis-octadecyl biphenyl - 3,5,3',5'-tetra (sulfonazide), 4,4'-diphenyl disulfide bis(sulfonazide), 1,6-bis(4'-sulfonazidophenyl) hexane, 2,7-naphthalene bis (sulfonazide), etc. Another class of azido cross-linking agents that may be used are azidoformates which have the general formula $$R(O\overset{O}{\underset{\|}{C}}N_3)_x$$

where $x$ is at least 1, preferably from about 1 to about 100, and R is an organic radical, inert to cross-linking reactions, containing at least one carbon atom per azidoformate group. Exemplary of these azidoformates are the alkyl azidoformates such as n-octadecyl azidoformate, tetramethylene-bis(azidoformate), pentamethylene - bis azidoformate); the cyclic alkyl azidoformates such as 2-(1-p-methyl-8-yloxy) ethyl azidoformate; the aromatic azidoformates such as phenyl azidoformate, α,α'-p-xylylene - bis(azidoformate), 2,2 - isopropylidene - bis(p,p'-phenyl azidoformate); the azidoformate ethers such as 2,2'-oxydiethyl-bis(azidoformate), 2,2' - oxydipropyl-bis (azidoformate), 2,2' - ethylenedioxydietyl - bis(azidoformate), the tetraazidoformate of pentaerythritol—propylene oxide adduct, the azidoformate thioethers such as 2,2'-thiodiethyl-bis(azidoformate), 4,4' - thiodibutyl-bis (azidoformate); etc. Still another class of azido cross-linking agents that can be used are the aromatic polyazides having the general formula $R(N_3)_x$ where R is an aromatic grouping inert to the cross-linking reaction, and $x$ is an integer greater than 1. Preferably $x$ will be an integer from 2 to 200 and R will be selected from the group of organic radicals consisting of arylene and alkarylene radicals. Exemplary of the aromatic polyazides useful in this invention are m-phenylene diazide, 2,4,6 - triazidobenzene, 4,4' - diphenyl diazide, 4,4' - diphenylmethane diazide, 4,4'-diazido diphenylamine, 4,4'-diazido diphenylsulfone, 2,7-diazidonaphthalene and 2,6-diazidoanthraquinone. Thus, any compound having at least one azido group in the molecule and preferably two or more can be used as the azido cross-linking agent to prepare the polypropylene foams used in this invention.

The amount of the azido cross-linking agent utilized in the preparation of these foams can be varied over a wide range. It must be an amount that is sufficient to prevent rupture of the cell walls when the foaming action takes place. Generally, it will be an amount of from about 0.01% for a final foam of 40 to 50 lbs./cu. ft. density, up to about 2% by weight of the polymer for foams below 5 lbs./cu. ft. density, although higher concentrations can be used if desired. The amount of blowing agent incorporated will obviously depend upon the degree of blowing desired; that is, the density desired for the final foamed product and the types of blowing agent used.

As pointed out above, the mixture of polyproylene, blowing agent, and azido cross-linking agent can be extruded, or injected, etc., directly into the mold cavity and molded by pressure on the plunger. In carrying out such a process, the above components are blended by any desired means and introduced into the extruder or injection molding machine, etc. Any desired means may be used for bringing about this blend. In the case of the chemical blowing agents, the azido cross-linking agent and the blowing agent may be mixed into a diluent such as acetone, which may also contain a stabilizer or other modifier for the polypropylene, and the polypropylene in finely divided form may then be added and mixed into a slurry. On evaporation of the diluent an intimate mixture of the polymer, cross-linking agent, and blowing agent is obtained which may then be used directly in the extruder. The azido cross-linking agent and the chemical blowing agent may also be blended in dry form with the powdered polymer by means of a high-speed mixer such as a Waring Blendor or Henschel mill. This dry mix may then be used directly in the extruder. When solvent types of blowing agents are employed, the stereoregular polypropylene and the azido cross-linking agent may be mixed and introduced into the extruder and the solvent blowing agent introduced directly into the extruder barrel through a vent generally located a short distance in front of the die of the extruder. In either case the temperature in the vicinity of the die of the extruder must be at least as high as the softening temperature of the mixture. The softening temperature of this mixture, or blend, will depend upon whether the blowing agent is a solvent type or a chemical type. Thus, with a solvent type, the polypropylene will at least partially dissolve so that the softening temperature of the blend can be as low as 135° C. On the other hand, with a chemical blowing agent, the softening temperature of the blend will be the melting point of the polymer and, hence, will be above about 165° C. Accordingly, the temperature within the extruder must be at least as high as the softening temperature of the mixture passing through the extruder. The exact temperature to be used for the total operation will depend upon the cross-linking and blowing agents used, the residence time in the extruder, etc. When the mixture of polypropylene, cross-linking agent, and blowing agent is heated in the extruder, particularly in the case of an extruder with a temperature gradient, blowing may be at least partially effected at the low temperature in the first zones of the extruder and cross-linking will be effected at the higher temperature in the final zones of the extruder, in which case the cross-linking is effected immediately prior to the expansion that takes place when the mass leaves the extruder at the die. The foamed mass leaving the extruder or injection machine is then passed into the cavity of the mold in an appropriate amount, and pressure is applied to the plunger to form the shaped article.

Alternatively, pellets or granules of a partially expanded and cross-linked mixture of polypropylene, blowing agent and azido cross-linking agent can be placed in the mold and the mold and pellets heated and molded. These partially expanded and cross-linked pellets are prepared by intimately mixing stereoregular polypropylene, an azido cross-linking agent, and a blowing agent and passing the mixture, or blend, through an extruder at a temperature above the softening temperature of the polymer, to form a partially cross-linked and partially expanded strand which is then chopped into pellets. The amount of this partial cross-linking and blowing must be such that less than about 90% of the potential blow of the mixture has been effected, preferably less than about 75% and more preferably from about 50% to about 75%. This partial blowing and cross-linking may be effected by a variety of means as, for example, by adjusting the time of heating, such as the residence time in an extruder, the temperature at which the partial expansion and cross-linking are carried out, etc.

Many variations can be made in the process of this invention and in the polypropylene foams used in this invention without departing from the invention. Thus, there can be incorporated in the polypropylene used or in the preparation of the blends of polypropylene, blowing agent, and cross-linking agent, such additives as light and heat stabilizers for the polypropylene, dyestuffs and pigments, flame retardants, including organic and inorganic flame retardants, such as chlorinated paraffin wax, antimony oxide and other such materials, etc. For the preparation of more flexible molded articles, natural or synthetic elastomers may be incorporated as, for example, ethylene-propylene copolymer rubbers, ethylene-propylene-diene terpolymer rubbers, polyisobutylene, etc. The amount of elastomer incorporated may be up to about 50% by weight of the polypropylene, but generally will be from about 5 to about 25% of the polymer. Many other variations will be apparent to those skilled in the art.

The following examples will illustrate the preparation of molded articles made from polypropylene foams in accordance with this invention. All parts and percentages are by weight unless otherwise indicated.

*Example 1*

A dry blend of 100 parts of a stereoregular polypropylene having an RSV of 2.7, 2 parts of azo bis(formamide) and 0.5 part of 1,10-decane-bis(sulfonazide) was extruded in a 1¼-inch extruder operating at 200–204° C. The expanding composition emerging from the extruder was collected in the female cavity of a cup mold which had been preheated to 193° C. When the precalculated weight of expanding polypropylene had been collected, the male plug was forced into place and the mold was allowed to cool. The expanded polypropylene cup so formed had a uniform cell structure with more than 50% of the cells closed and a density of 20–25 lbs./cu.ft. The cup had smooth surfaces both inside and out.

*Example 2*

The dry blend used in Example 1 was extruded at 177° C. into strands. These partially expanded and cross-linked strands were chopped into pellets. The cup mold was preheated to 193° C., a calculated weight of the expandable pellets was placed in the cavity and the plug was forced into place. The mold was then placed in a press, heated to 204° C., for 10 minutes, with the pressure maintained so that the mold closed completely as the pellets softened and expanded. The finished cup had smooth surfaces. The foam was uniform in structure with more than 50% of the cells closed, and it had a density of 20–25 lbs./cu. ft.

As may be seen from the foregoing examples, the process of this invention offers a highly practical method for fabricating three-dimensional shapes of expanded polypropylene. These shaped articles can be produced in any desired density anywhere from 50 lbs./cu. ft. down to as low as 5 lbs./cu.ft. or even less. Another advantage is that the cell structure is uniform and predominantly closed cell, at least 50% of the cells being closed, and in many cases more than 70% of the cells are closed. As a result, the articles produced in accordance with this invention have far greater utility and strength than articles produced by other means where largely open-celled structures are obtained. Obviously, many variations of the process may be made without departing from the scope of the invention.

What I claim and desire to protect by Letters Patent is:

1. The process of producing a molded article of cross-linked cellular polypropylene having a uniform cell structure in which at least 50% of the cells are closed which comprises shaping a mass of a polypropylene composition between the male and female members of a matched mold by applying an external mechanical force on one of said members onto said polypropylene composition contained in the other of said members, said polypropylene composition comprising stereoregular polypropylene, a blowing agent which yields at least one mole of gas per mole of blowing agent at a temperature within the range of from the softening temperature of the composition to about 190° C., and from about 0.01% to about 2%, based on the weight of polypropylene in the composition of a poly(azidoformate) as the cross-linking agent, said composition being at a temperature above the softening point of said composition and sufficient to release gas from said blowing agent and to effect cross-linknng of said polypropylene.

2. The process of claim 1 wherein the female member of said mold has been preheated to approximately the same temperature as the polypropylene composition being introduced therein.

3. The process of claim 1 wherein the mold contains said polypropylene composition in the form of expandable pellets and is heated to a temperature above the softening point of said composition and sufficient to release the gas from said blowing agent and to effect cross-linking of said polypropylene.

References Cited by the Examiner

UNITED STATES PATENTS

| | | | |
|---|---|---|---|
| 2,518,249 | 8/1950 | Ott | 260—2.5 |
| 2,532,243 | 11/1950 | Ott | 260—2.5 |
| 2,678,293 | 5/1954 | McMillan et al. | 260—2.5 |
| 2,830,029 | 4/1958 | Adams | 260—2.5 |
| 2,927,904 | 3/1960 | Cooper | 260—2.5 |
| 2,983,692 | 5/1961 | D'Alelio | 260—2.5 |
| 3,017,371 | 1/1962 | Hohenberg et al. | 260—2.5 |
| 3,058,944 | 10/1962 | Breslow et al. | 260—2.5 |
| 3,072,972 | 1/1963 | Yokese et al. | 260—2.5 |
| 3,086,248 | 4/1963 | Culp | 264—53 |
| 3,121,130 | 2/1964 | Wiley et al. | 264—53 |
| 3,124,627 | 3/1964 | Hood | 264—54 |
| 3,137,745 | 6/1964 | Johnstone | 260—2.5 |

FOREIGN PATENTS 856,735  12/1960  Great Britain.

MURRAY TILLMAN, *Primary Examiner.*

DONALD E. CZAJA, *Examiner.*